United States Patent
Wang

(10) Patent No.: US 11,412,665 B2
(45) Date of Patent: Aug. 16, 2022

(54) FLOWER SHAPED FIXING STRUCTURE FOR FLOWER COMBINATION PROVIDED IN TOP OPENING OF VASE/POT

(71) Applicant: CHU HSING METAL CO., LTD., Changhua County (TW)

(72) Inventor: Kuan-Chuan Wang, Changhua County (TW)

(73) Assignee: CHU HSING METAL CO., LTD., Changhua County (TW)

( * ) Notice: Subject to any disclaimer, the term of this patent is extended or adjusted under 35 U.S.C. 154(b) by 0 days.

(21) Appl. No.: 17/074,406

(22) Filed: Oct. 19, 2020

(65) Prior Publication Data

US 2022/0117163 A1   Apr. 21, 2022

(51) Int. Cl.
  *A01G 5/04*   (2006.01)
  *A01G 9/02*   (2018.01)
  *A01G 9/00*   (2018.01)

(52) U.S. Cl.
  CPC ............ *A01G 5/04* (2013.01); *A01G 9/028* (2013.01); *A01G 2009/003* (2013.01)

(58) Field of Classification Search
  CPC .................................. A01G 5/04; A01G 9/028
  See application file for complete search history.

(56) References Cited

U.S. PATENT DOCUMENTS

| | | | | |
|---|---|---|---|---|
| 1,562,992 A * | 11/1925 | Schling | ............... | A47G 7/06 47/41.13 |
| 1,989,403 A * | 1/1935 | Dauernheim | ......... | A01G 9/028 47/80 |
| 2,930,162 A * | 3/1960 | Mulford | ............... | A01G 31/02 47/79 |
| 3,768,202 A * | 10/1973 | Wheelock | ............... | A47G 7/07 473/612 |
| 4,213,274 A * | 7/1980 | Skaife | ................... | A01G 9/028 47/81 |
| 4,803,806 A * | 2/1989 | Ito | ........................... | A01G 9/28 47/87 |
| 4,860,491 A * | 8/1989 | Panuski | ................... | A01G 9/02 47/79 |
| 5,947,322 A * | 9/1999 | Ho | ...................... | B65F 1/1607 220/477 |

(Continued)

FOREIGN PATENT DOCUMENTS

GB        2147205 A  *  5/1985  ............... A01G 5/04

*Primary Examiner* — Jessica B Wong
(74) *Attorney, Agent, or Firm* — Chun-Ming Shih; Lanway IPR Services

(57) ABSTRACT

A fixing structure for a flower combination contains: a container and a flower pot. The container includes a conical groove, and a diameter of a top of the conical groove is more than a diameter of a bottom of the conical groove. The conical groove has multiple arcuately concaved trenches and multiple arcuate slots. A respective arcuately concaved trench and a respective arcuate slot are conical, a diameter of a top of the respective arcuately concaved trench is more than a diameter of a bottom of the respective arcuately concaved trench, and a diameter of a top of the respective arcuate slot is more than a diameter of a bottom of the respective arcuate slot, such that an accommodation zone is defined by the multiple arcuately concaved trenches of the conical groove and the multiple arcuate slots so as to receive the flower combination.

5 Claims, 9 Drawing Sheets

(56) References Cited

U.S. PATENT DOCUMENTS

| | | | | |
|---|---|---|---|---|
| 6,223,466 B1* | 5/2001 | Billings | ................... | A01G 9/02 |
| | | | | 47/75 |
| 6,457,276 B1* | 10/2002 | Masters | ................... | A47G 7/07 |
| | | | | 47/41.01 |
| 6,843,021 B1* | 1/2005 | Huang | ................... | A01G 9/12 |
| | | | | 47/60 |
| 8,708,166 B1* | 4/2014 | Crouch | ................. | A47G 19/00 |
| | | | | 211/85.4 |
| 2006/0168880 A1* | 8/2006 | Parnell | .................... | A01G 5/04 |
| | | | | 47/41.12 |
| 2009/0265981 A1* | 10/2009 | Yu | ........................... | A01G 5/04 |
| | | | | 47/41.01 |
| 2012/0023817 A1* | 2/2012 | Charrin | ................ | B65D 85/505 |
| | | | | 47/41.13 |
| 2015/0237807 A1* | 8/2015 | Valiquette | ............. | A01G 27/02 |
| | | | | 47/66.7 |
| 2016/0353674 A1* | 12/2016 | Keats | .................... | A01G 9/023 |
| 2019/0200539 A1* | 7/2019 | McGrath | ............. | A01G 9/0291 |
| 2020/0323366 A1* | 10/2020 | Luk | .......................... | A01G 5/04 |
| 2021/0071439 A1* | 3/2021 | Currie | .................... | A01G 5/04 |
| 2021/0084830 A1* | 3/2021 | Wu | .......................... | B65D 1/34 |
| 2021/0219750 A1* | 7/2021 | Wong | ..................... | A01G 5/04 |
| 2021/0353078 A1* | 11/2021 | Urrego Bernal | ......... | A47G 7/07 |

* cited by examiner

FLOWER SHAPED FIXING STRUCTURE FOR FLOWER COMBINATION PROVIDED IN TOP OPENING OF VASE/POT

FIELD OF THE INVENTION

The present invention relates to a fixing structure for a flower combination by which the flower combination is received in an accommodation zone defined by multiple arcuately concaved trenches and multiple arcuate slots of a container and a conical groove, thus forming the flower combination quickly and easily.

BACKGROUND OF THE INVENTION

Flower combinations are often used to decorate various meeting places, such as weddings, funerals, new home completion, company openings, etc. The most popular flower combinations are a verity of orchids which are bed planted, and are arranged in the flower combination based on using requirements with different flowers.

When forming the flower combination, a suitable flower post or vase of large size is selected, but it is impossible to accommodate the orchids in the plate pot directly. To overcome such a problem, stuffing (such as Styrofoam or other materials) are filled into the plant pot at a specific height so as to accommodate the orchids, thus filling the stuffing troublesomely. Furthermore, the orchids cannot be fixed in the plant pot securely.

Accordingly, it is required to spend high labor cost and material cost when accommodating the orchids to the plant pot so as form the flower combination.

The present invention has arisen to mitigate and/or obviate the afore-described disadvantages.

SUMMARY OF THE INVENTION

The primary aspect of the present invention is to provide a fixing structure which is applied to fix a flower combination quickly and easily.

Secondary aspect of the present invention is to provide a fixing structure by which the flower combination is received in an accommodation zone defined by multiple arcuately concaved trenches and multiple arcuate slots of a container and a conical groove, thus avoiding a waste of fixing stuffing, such as Styrofoam, clothes, or other materials.

Another aspect of the present invention is to provide a fixing structure by which the flower combination is received in the accommodation zone defined by the multiple arcuately concaved trenches and the multiple arcuate slots of the container and the conical groove, thus avoiding filling fixing stuffing (such as Styrofoam, clothes, or other materials) to fix the flower combination easily, save labor cost, and recycle the container.

DETAILED DESCRIPTION OF THE PREFERRED EMBODIMENTS

Figure 1:
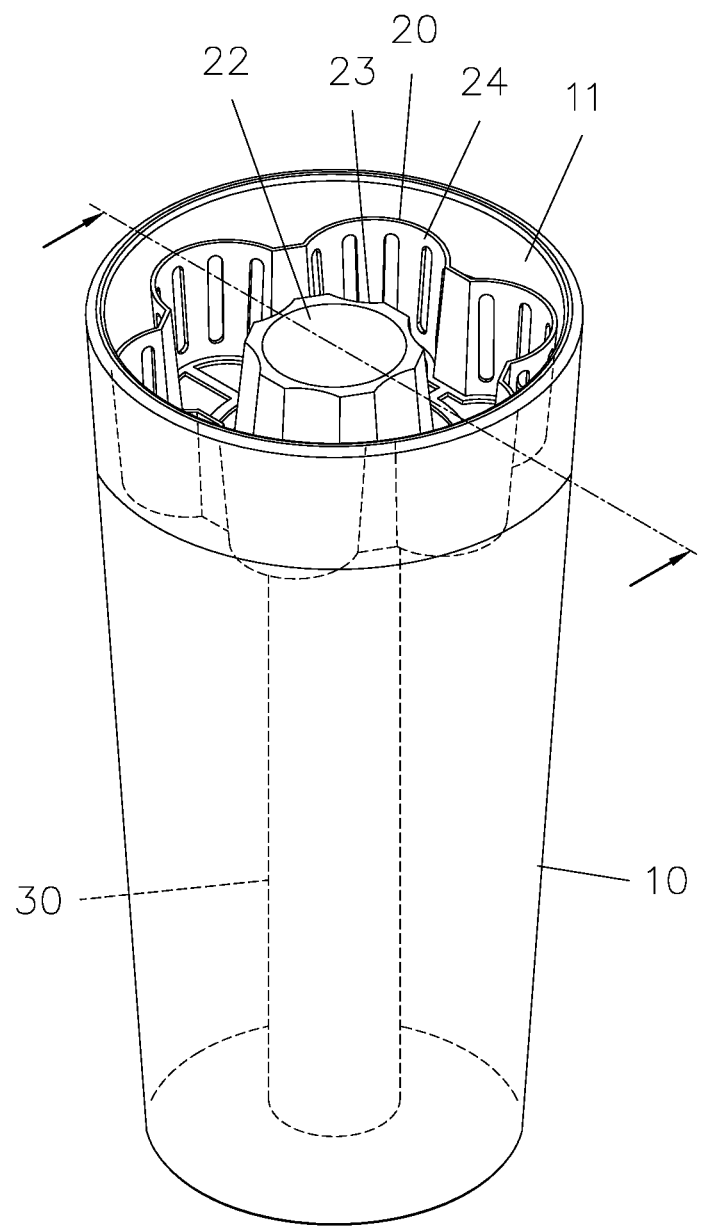
FIG. 1 is a perspective view showing the assembly of a fixing structure of a flower combination according to a first embodiment of the present invention.
Figure 2:
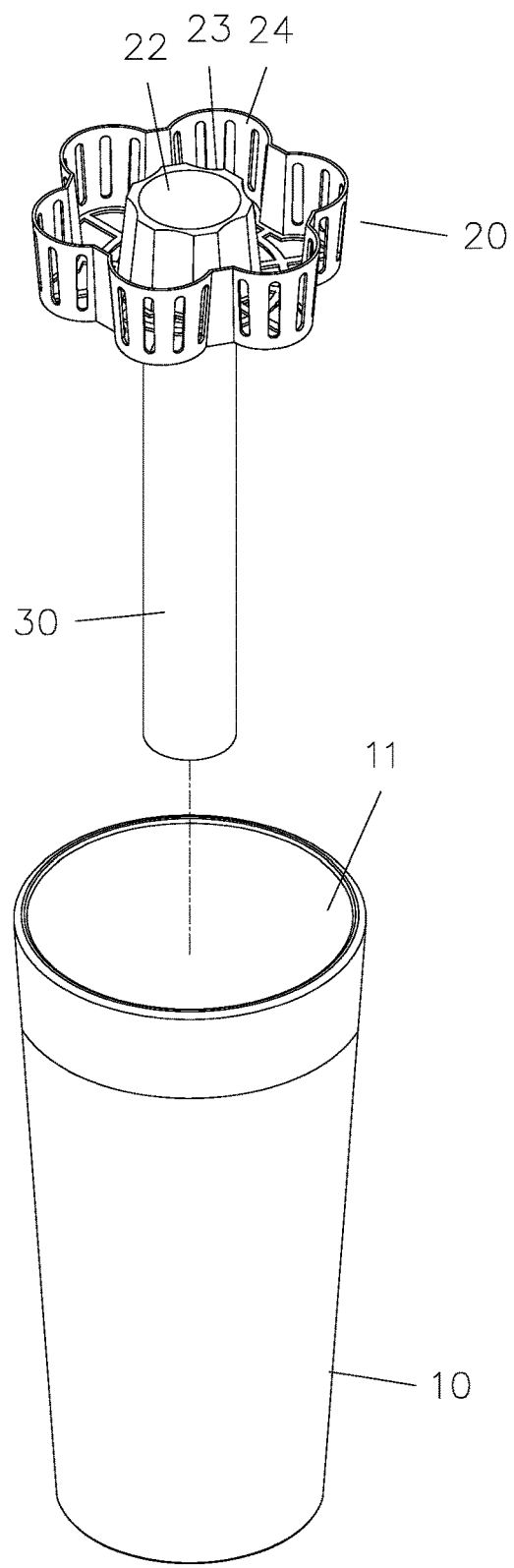
FIG. 2 is a perspective view showing the exploded components of the fixing structure for the flower combination according to the first embodiment of the present invention.
Figure 3:
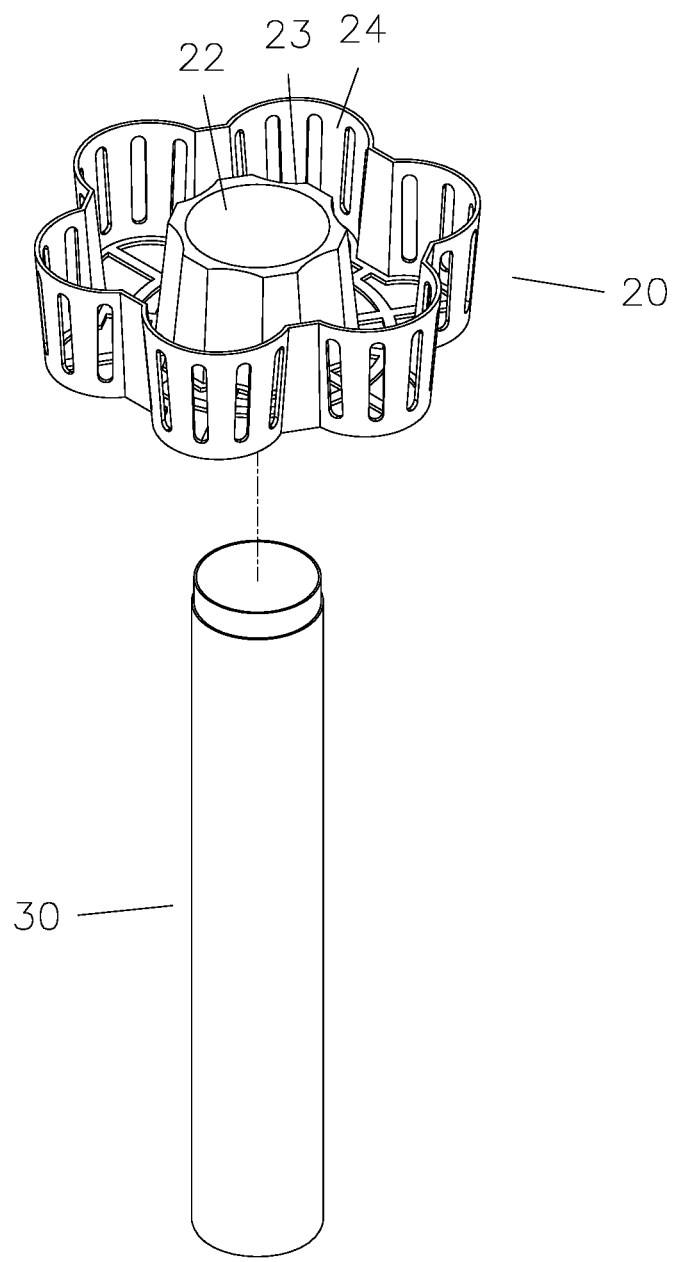
FIG. 3 is a perspective view showing the exploded components of a part of the fixing structure for the flower combination according to the first embodiment of the present invention.
Figure 4:
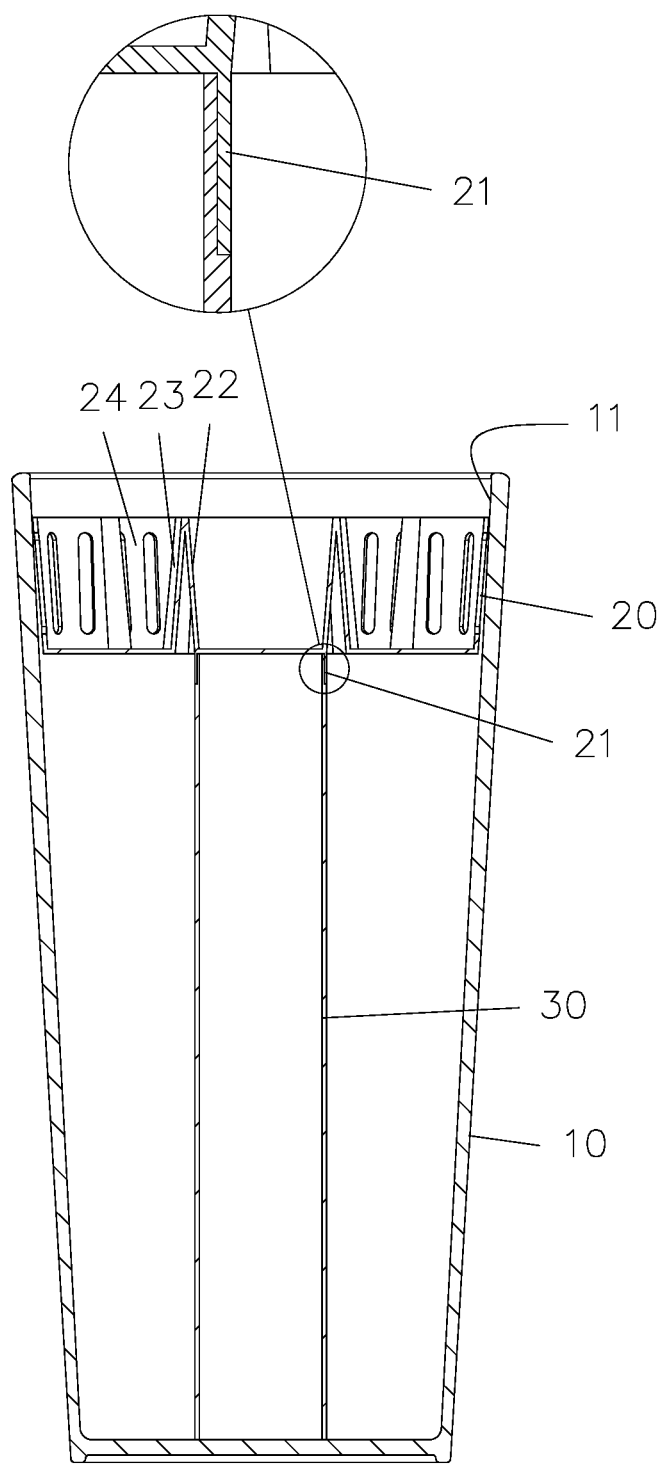
FIG. 4 is a cross sectional view showing the assembly of the fixing structure for the flower combination according to the first embodiment of the present invention.
Figure 5:
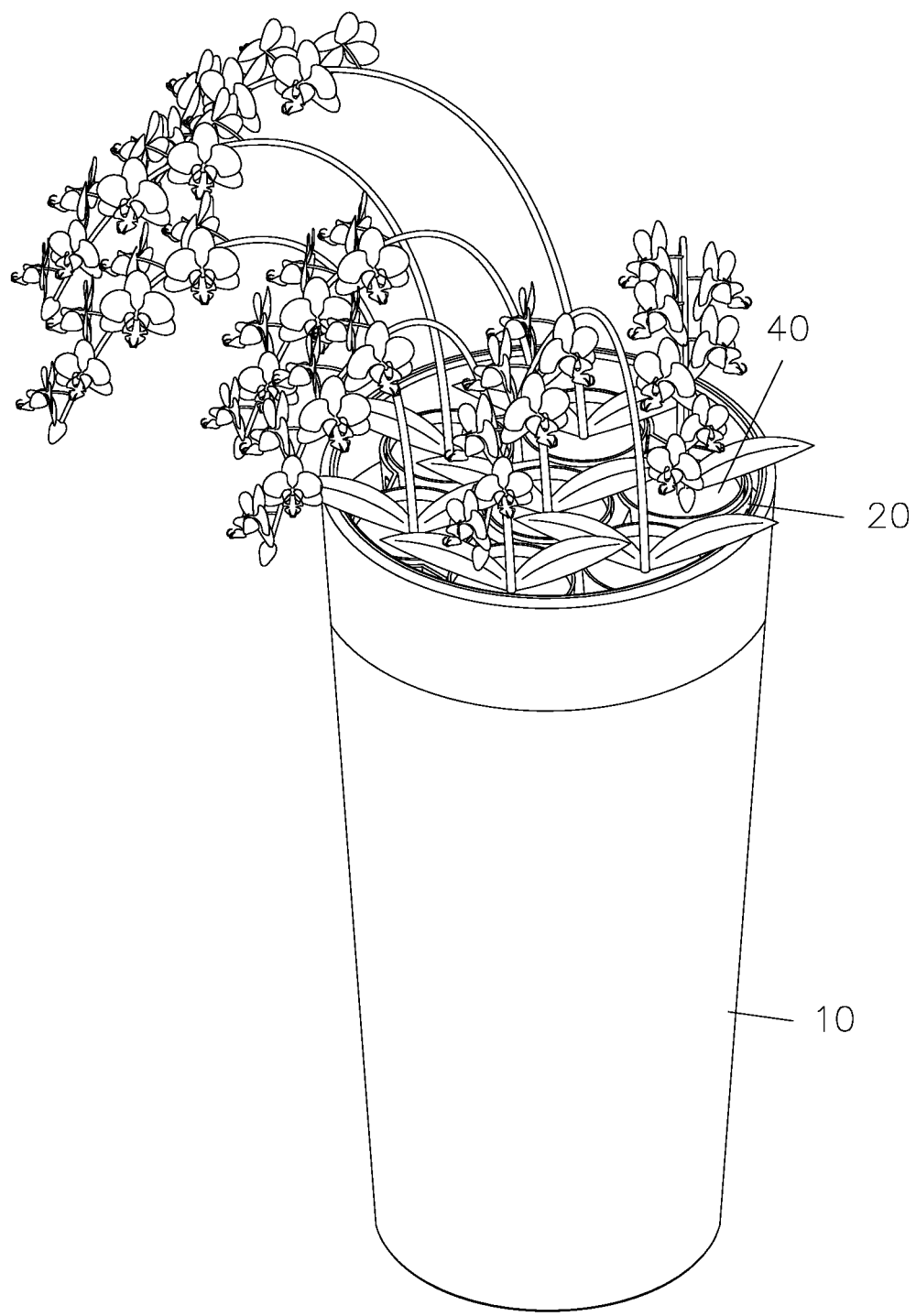
FIG. 5 is a perspective view showing the application of the fixing structure for the flower combination according to the first embodiment of the present invention.

With reference to FIGS. 1-5, a fixing structure for a flower combination according to a first embodiment of the present invention comprises: a container 20 accommodated in a top of a vase or a flower pot 10, wherein a diameter of the container 20 is less than a diameter of an opening 11 of the flower pot 10 so that the container 20 is accommodated in the opening 11, a receiving portion 21 is formed on a center of a bottom of the container 20 so as to fit with a support post 30, wherein a length of the support post 30 is equal to a length of the flower pot 10 minus a height of the container 20 so that the support post 30 supports the container 20, and the container 20 is accommodated in the opening 11 of the top of the container 20. The container 20 includes a conical groove 22 defined therein, and a diameter of a top of the conical groove 22 is more than a diameter of a bottom of the conical groove 22. The conical groove 22 has multiple arcuately concaved trenches 23 formed around an outer wall thereof, and multiple arcuate slots 24 are defined around a peripheral wall of the container 20 and correspond to the multiple arcuately concaved trenches 23, wherein a shape of a cross section of the container 20 is in a flower shape, a respective arcuately concaved trench 23 and a respective arcuate slot 24 are conical, a diameter of a top of the respective arcuately concaved trench 23 is more than a diameter of a bottom of the respective arcuately concaved trench 23, and a diameter of a top of the respective arcuate slot 24 is more than a diameter of a bottom of the respective arcuate slot 24, such that an accommodation zone is defined by the multiple arcuately concaved trenches 23 of the conical groove 22 and the multiple arcuate slots 24 so as to receive the flower combination 40.

When fixing the flower combination 40 (including multiple orchid pots) onto the container 20, it is received in the accommodation zone (defined by the multiple arcuately concaved trenches 23 and the multiple arcuate slots 24) and the conical groove 22, and the multiple orchid pots are fixed in various directions, thus forming the flower combination 40 quickly and easily to avoid a waste of fixing stuffing, such as Styrofoam, clothes, or other materials.

Figure 6:
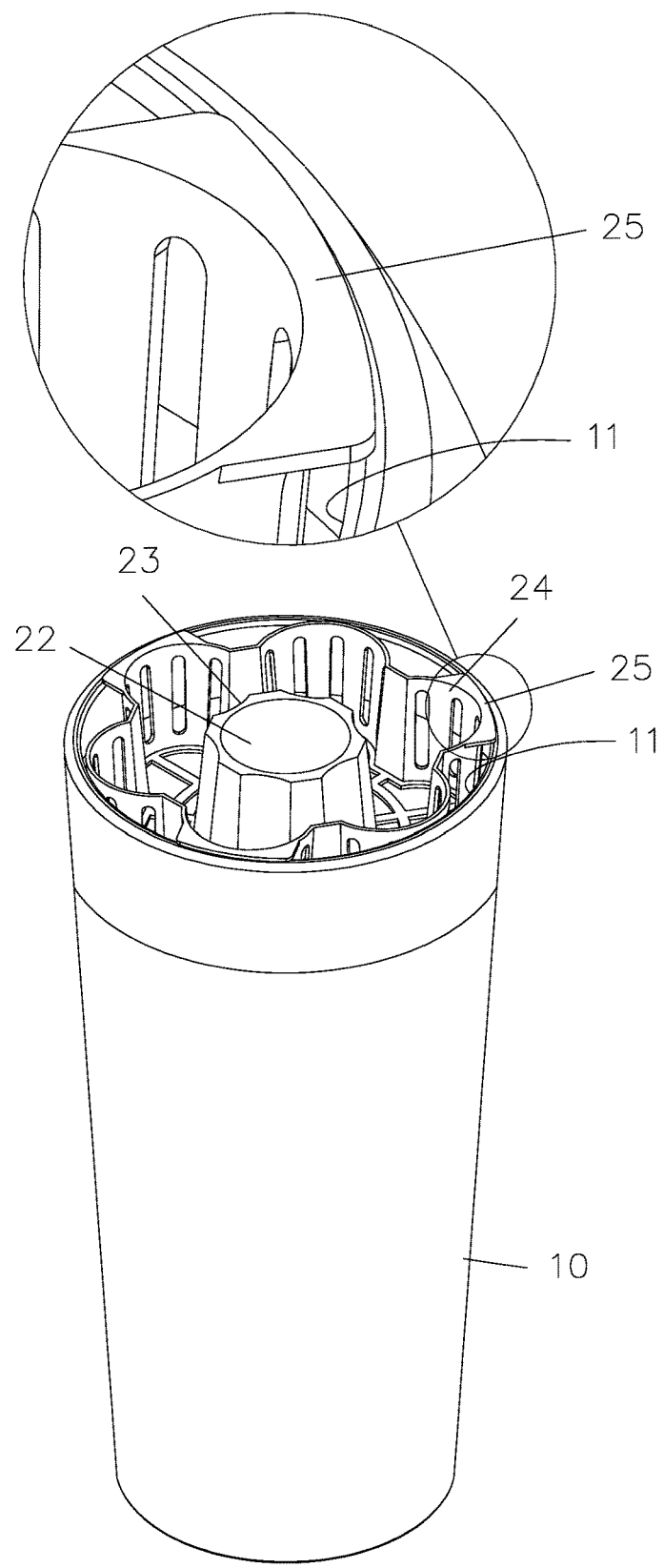
FIG. 6 is a perspective view showing the assembly of a fixing structure of a flower combination according to a second embodiment of the present invention.
Figure 7:
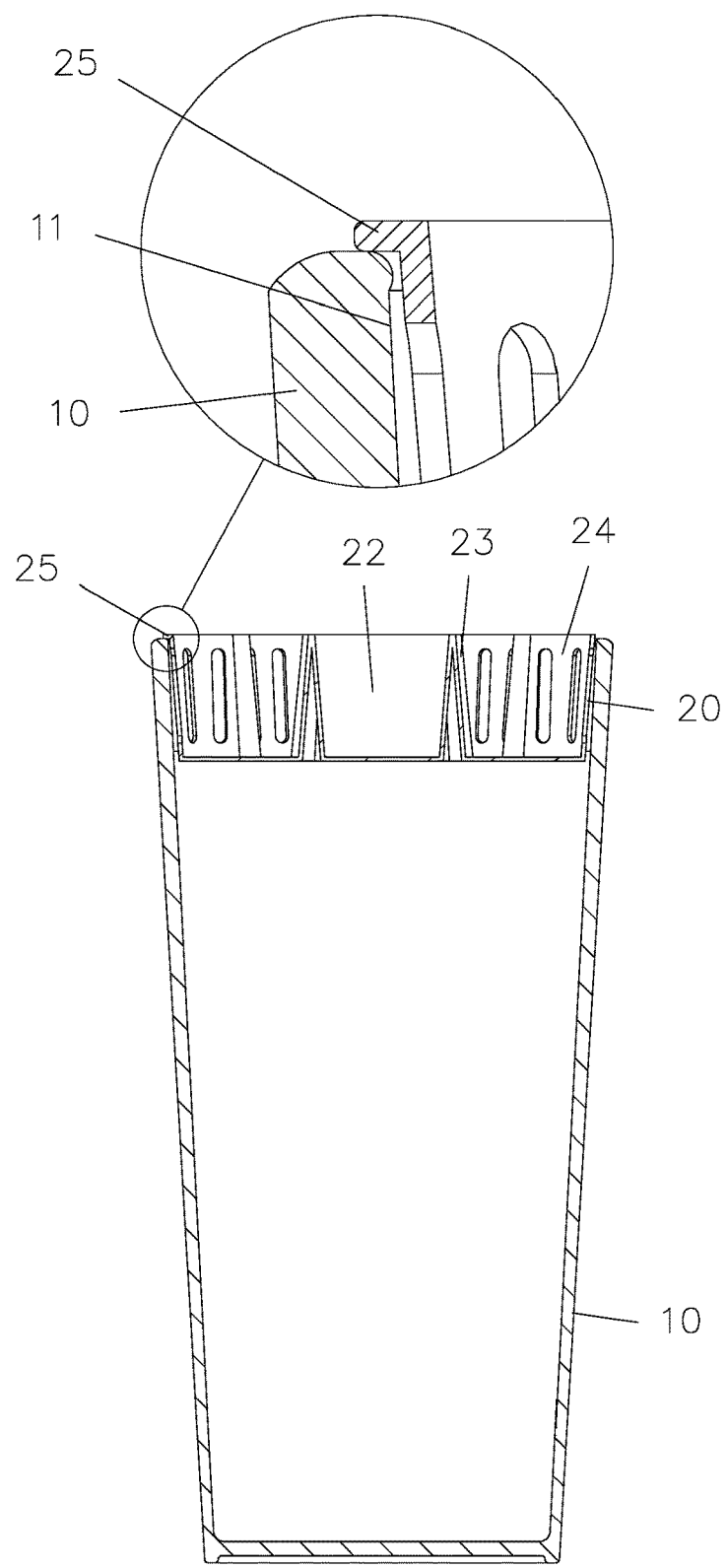
FIG. 7 is a cross sectional view showing the assembly of the fixing structure of the flower combination according to the second embodiment of the present invention.

Referring to FIGS. 6-9, in a second embodiment, when accommodating the container 20 in the opening 11 of the flower pot 10, the support post 30 supports the container 20, wherein the container 20 includes multiple stop ribs 25 extending outward from a top of the peripheral wall of the container 20 above the multiple arcuate slots 24, and a diameter of the top of the peripheral wall of the container 20 defined by the multiple stop ribs 25 is more than a diameter of the opening 11 of the flower pot 10 so that when the container 20 is accommodated in the opening 11 of the flower pot 10, the multiple stop ribs 25 abut against the opening 11, thus accommodating the container 20 in the opening 11 of the flower pot 10 securely, as shown in FIGS. 6 and 7.

Figure 8:
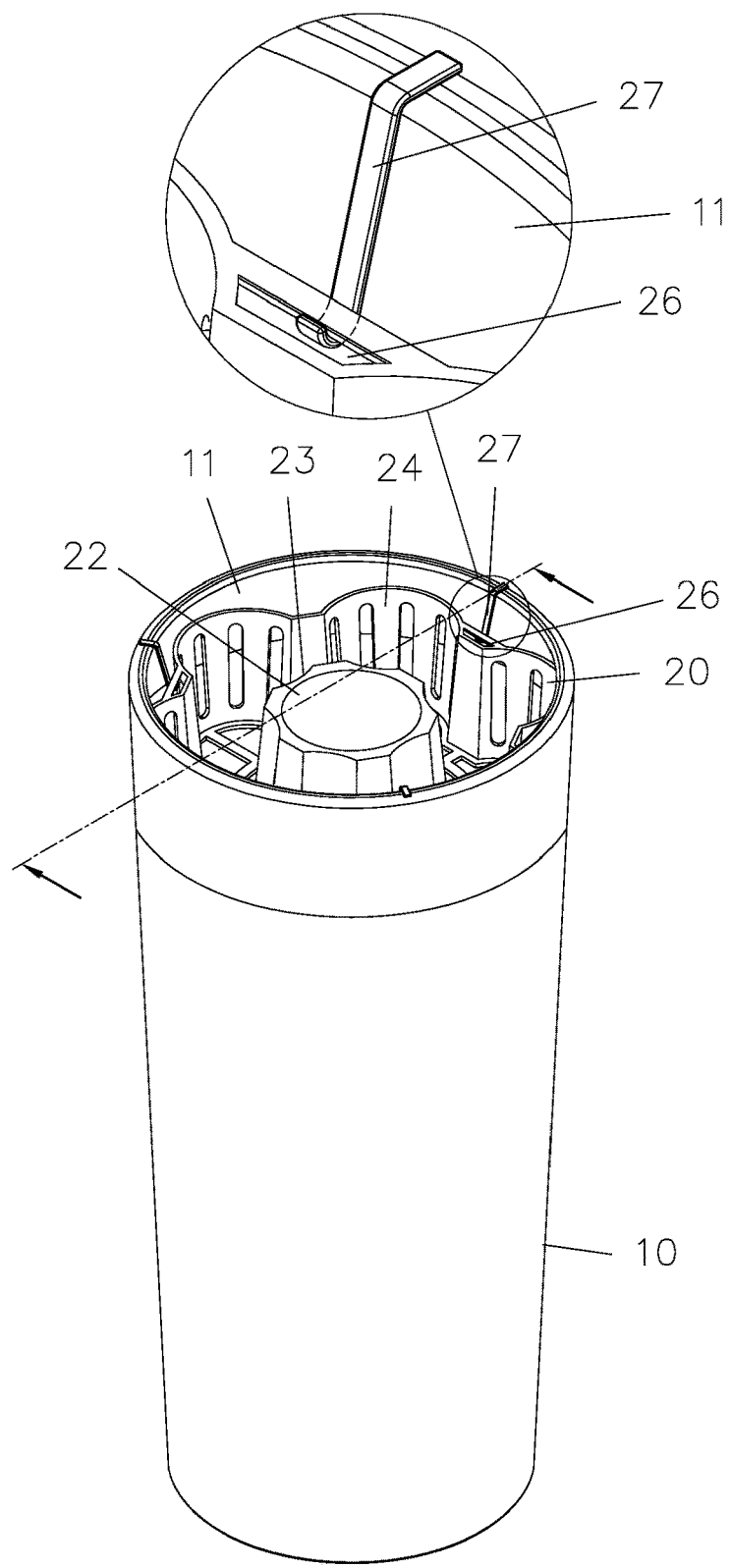
FIG. 8 is a perspective view showing the assembly of a fixing structure of a flower combination according to a third embodiment of the present invention.
Figure 9:
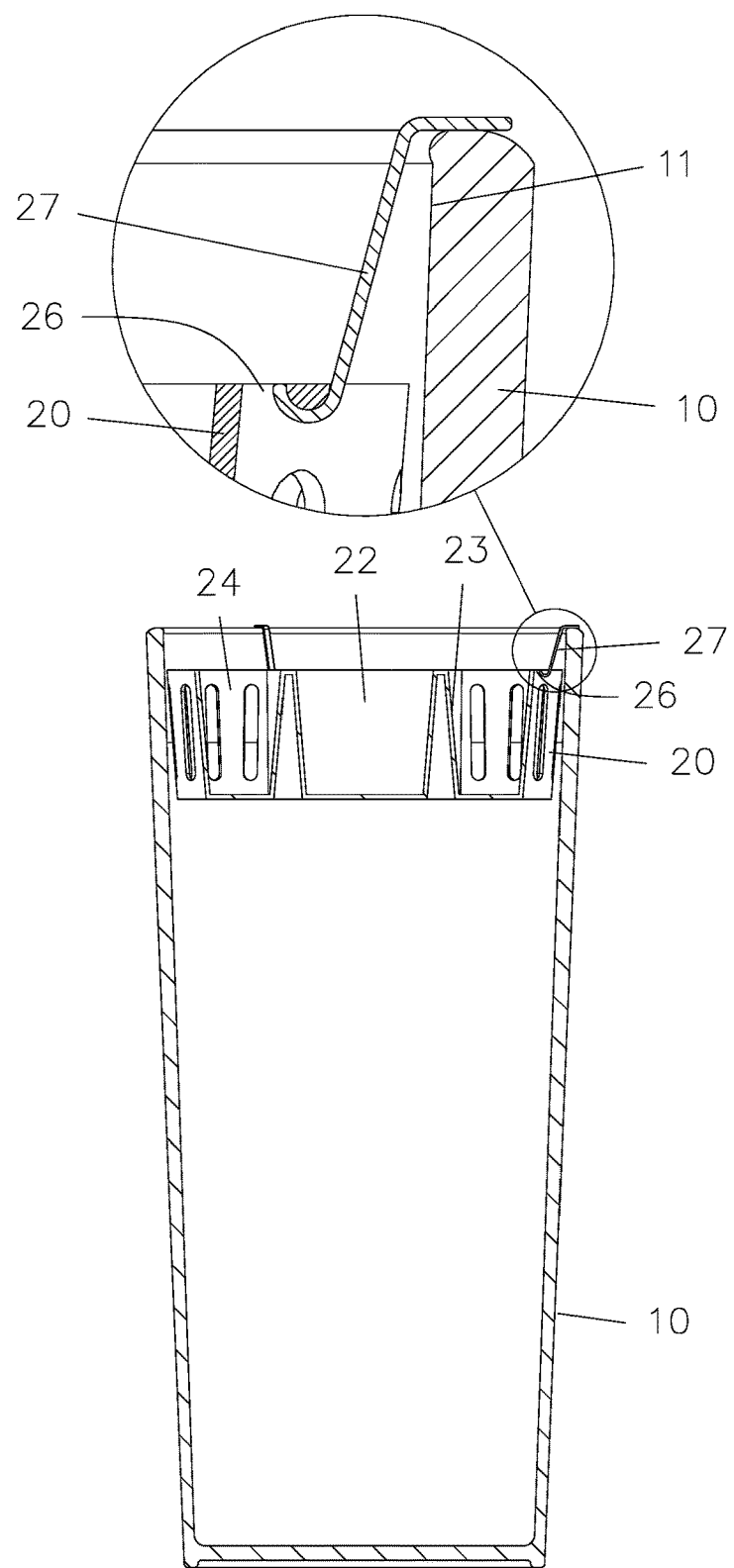
FIG. 9 is a cross sectional view showing the assembly of the fixing structure of the flower combination according to the third embodiment of the present invention.

In a third embodiment, the container 20 includes multiple recesses 26 defined on a top of the peripheral wall of the container 20 above the multiple arcuate slots 24 and configured to fix with multiple hooks 27, and the multiple hooks 27 are hooked on the opening 11 of the flower pot 10, thus accommodating the container 20 in the opening 11 of the flower pot 10 securely, as illustrated in FIGS. 8 and 9.

Thereby, the container is accommodated in the opening of the flower pot to receive the flower combination (including the multiple orchid pots) in the accommodation zone of the container, such that the flower combination is formed quickly to avoid the waste of stuffing, such as Styrofoam, clothes, or other materials.

Preferably, the opening of the flower pot accommodates the container, and the accommodation zone is defined by the multiple arcuately concaved trenches of the conical groove and the multiple arcuate slots so as to alternatively receive the flower combination in the accommodation zone or the conical groove, thus fixing the flower combination quickly.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fixing structure for a flower combination comprising: a container configured in a top of a vase or a flower pot; wherein a diameter of the container is less than a diameter of an opening at the top of vast or the flower pot so that the container is configured in the opening, the container includes a conical groove defined therein, and a diameter of a top of the conical groove is more than a diameter of a bottom of the conical groove, the conical groove has multiple arcuately concaved trenches formed around an outer wall thereof, and multiple arcuate slots are defined around an outer wall of the container and correspond to the multiple arcuately concaved trenches, wherein a first arrangement of the arcuately concaved trenches and a second arrangement of the arcuate slots are conical, a diameter of a top of the first arrangement is more than a diameter of a bottom of the first arrangement, and a diameter of a top of the second arrangement is more than a diameter of a bottom of the second arrangement, such that an accommodation zone is defined by the multiple arcuately concaved trenches of the conical groove and the multiple arcuate slots so as to receive the flower combination.

2. The fixing structure as claimed in claim 1, wherein a shape of a cross section of the container is in a flower shape.

3. The fixing structure as claimed in claim 1, wherein a receiving portion is formed on a center of a bottom of the container so as to fit with a support post, a length of the support post is equal to a length of the flower pot minus a height of the container so that the support post supports the container, and the container is configured in the opening of the top of the container.

4. The fixing structure as claimed in claim 1, wherein the container includes multiple stop ribs extending outward from a top of the outer wall of the container above the multiple arcuate slots, and a diameter of the top of the outer wall of the container defined by the multiple stop ribs is more than a diameter of the opening of the flower pot so that when the container is configured in the opening of the flower pot, the multiple stop ribs abut against the opening, thus configuring the container in the opening of the flower pot securely.

5. The fixing structure as claimed in claim 1, wherein the container includes multiple recesses defined on a top of the outer wall of the container above the multiple arcuate slots and configured to fix with multiple hooks, and the multiple hooks are hooked on the opening of the flower pot, thus configuring the container in the opening of the flower pot securely.

* * * * *